US012587673B2

(12) United States Patent
Heo et al.

(10) Patent No.: US 12,587,673 B2
(45) Date of Patent: Mar. 24, 2026

(54) METHOD FOR DECODER-SIDE MOTION VECTOR DERIVATION USING SPATIAL CORRELATION

(71) Applicants: Hyundai Motor Company, Seoul (KR); Kia Corporation, Seoul (KR)

(72) Inventors: Jin Heo, Seoul (KR); Seung Wook Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/746,839

(22) Filed: Jun. 18, 2024

(65) Prior Publication Data

US 2024/0340443 A1 Oct. 10, 2024

Related U.S. Application Data

(63) Continuation of application No. PCT/KR2022/020381, filed on Dec. 14, 2022.

(30) Foreign Application Priority Data

Jan. 4, 2022 (KR) ........................ 10-2022-0000923
Dec. 13, 2022 (KR) ........................ 10-2022-0173975

(51) Int. Cl.
H04N 19/55 (2014.01)
H04N 19/105 (2014.01)
H04N 19/109 (2014.01)
H04N 19/132 (2014.01)
H04N 19/139 (2014.01)
H04N 19/159 (2014.01)
(Continued)

(52) U.S. Cl.
CPC ........... *H04N 19/55* (2014.11); *H04N 19/105* (2014.11); *H04N 19/109* (2014.11); *H04N 19/132* (2014.11); *H04N 19/139* (2014.11); *H04N 19/159* (2014.11); *H04N 19/176* (2014.11); *H04N 19/52* (2014.11)

(58) Field of Classification Search
None
See application file for complete search history.

(56) References Cited

U.S. PATENT DOCUMENTS

| | | | |
|---|---|---|---|
| 6,480,546 B1 | 11/2002 | Kim et al. | |
| 11,563,949 B2 * | 1/2023 | Chen ....................... | H04N 19/44 |
| 2020/0021843 A1 | 1/2020 | Li et al. | |

(Continued)

FOREIGN PATENT DOCUMENTS

| | | |
|---|---|---|
| KR | 10-1999-0086428 A | 12/1999 |
| KR | 10-2019-0024765 A | 3/2019 |

(Continued)

*Primary Examiner* — Talha M Nawaz
(74) *Attorney, Agent, or Firm* — Fox Rothschild LLP

(57) ABSTRACT

A method for decoder-side motion vector derivation utilizes a spatial correlation. A video coding method and apparatus minimize discontinuities at block boundaries, in order to overcome disadvantages of motion prediction that performs motion compensation on a per block basis. The video coding method and the apparatus derive, during decoder-side motion vector derivation, motion vectors by taking into account spatial correlation of the current block with surrounding blocks rather than deriving motion vectors by considering only the cost of a current and prediction block.

19 Claims, 12 Drawing Sheets

(51) Int. Cl.
  *H04N 19/176*          (2014.01)
  *H04N 19/52*           (2014.01)

(56)                References Cited

U.S. PATENT DOCUMENTS

| 2021/0185328 | A1   | 6/2021  | Xu et al. |            |
| 2021/0266525 | A1   | 8/2021  | Tsukuba   |            |
| 2021/0344925 | A1 * | 11/2021 | Galpin    | H04N 19/137 |
| 2022/0417554 | A1   | 12/2022 | Lee       |            |
| 2024/0283969 | A1 * | 8/2024  | Zhang     | H04N 19/52 |
| 2024/0323353 | A1 * | 9/2024  | Zhang     | H04N 19/52 |
| 2025/0150604 | A1 * | 5/2025  | Zhang     | H04N 19/139 |

FOREIGN PATENT DOCUMENTS

| KR | 10-2020-0116524 A | 10/2020 |
| KR | 10-2021-0021971 A | 3/2021  |
| KR | 10-2021-0024165 A | 3/2021  |

* cited by examiner

METHOD FOR DECODER-SIDE MOTION VECTOR DERIVATION USING SPATIAL CORRELATION

CROSS-REFERENCE TO RELATED APPLICATIONS

This application is a continuation of International Application No. PCT/KR2022/020381 filed on Dec. 14, 2022, which claims under 35 U.S.C. § 119 (a) the benefit of Korean Patent Application No. 10-2022-0000923, filed on Jan. 4, 2022, and Korean Patent Application No. 10-2022-0173975, filed on Dec. 13, 2022, the entire contents of each of which are incorporated herein by reference.

BACKGROUND

(a) Technical Field

The present disclosure relates to a method for decoder-side motion vector derivation using a spatial correlation.

(b) Description of the Related Art

Since video data has a large size compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

Template matching (TM) is a method for compensation of motion information in the current block also referred to as a coding unit block (CU) to derive a motion vector at a decoder. Template matching compares for similarity between templates in the current frame and the corresponding templates in the reference frame. This is illustrated in FIG. 6 where the current frame templates are composed of the current block's neighboring pixels identified as cur. templates by a left block and above block, and the corresponding templates are identified as ref. templates. Here, generating the templates may be done per candidate in the candidate list. The template matching selects among the candidate templates in the reference picture the template with the highest similarity to the templates of the current block to determine the initial motion information identified as the initial MV in FIG. 6. Once the initial motion information of the current block is determined, the motion information is compensated by performing the template matching within a sample search range of [−8, +8] relative to the initial motion information.

Template matching may be used in Advanced Motion Vector Prediction (AMVP) mode and merge mode. The AMVP mode determines an optimal motion vector by using the AMVP's motion vector determination method based on the AMVP candidate list, and then using the determined motion vector as the initial motion information, compensates the motion information by performing template matching as shown in the example of FIG. 6. The merge mode selects an optimal merging candidate by using a merging candidate determination method based on a merging candidate list, and using the motion vector of the selected merging candidate as the initial motion information, compensates the motion information by performing the template matching as shown in FIG. 6.

In the process of deriving the motion vector, the decoder may select a method that is better in terms of rate-distortion optimization (RDO) between the method of compensating the motion information by using the template matching and the method of compensating the motion information by taking into account the spatial correlation.

For example, as shown in FIG. 7, the decoder may derive the motion vector by selecting the better of a method in the template matching method for refining the motion vector based on a template matching cost, and a method in the spatial correlation consideration method for refining the motion vector based on a block boundary discontinuity measure. The information indicating either method may be transmitted/parsed as a block unit, i.e., coding unit or CU flag. The decoder decodes from the bitstream the flag indicating the application of the template matching method (S700) and then checks the flag (S702). Depending on the value of the flag, the decoder may perform one of two methods (S704, S706) to refine the initial motion vector (S708).

From now on, the decoder-side motion vector derivation utilizing such template matching or spatial correlation needs to be further employed to improve video quality and enhance video coding efficiency.

SUMMARY

The present disclosure provides a video coding method and an apparatus that derive, during decoder-side motion vector derivation, motion vectors by taking into account spatial correlation of the current block with surrounding blocks rather than deriving motion vectors by considering only the cost of current and prediction block. The video coding method and the apparatus improve video quality and increase video coding efficiency by minimizing discontinuities at block boundaries, which are disadvantages of motion prediction that performs motion compensation per block basis.

At least one aspect of the present disclosure provides a method performed by a video decoding device for refining a motion vector of a current block. The method includes obtaining an initial motion vector according to an inter-prediction mode of the current block. The method also includes calculating a template matching cost by applying a template matching method to the current block and a corresponding reference block that is a reference block present in a search range of a reference picture with the initial motion vector as a reference. The method also includes calculating a discontinuity measure at a boundary of the reference block by applying a method of utilizing spatial correlation. The method also includes calculating a combined cost by a weighted summation with weights on the template matching cost and the discontinuity measure. The method also includes selecting from the search range a reference block having a minimum of the combined cost, and then generating a final motion vector by refining the initial motion vector based on motion information between the reference block having been selected and the current block.

Another aspect of the present disclosure provides a method performed by a video encoding device for refining a motion vector of a current block. The method includes determining an inter-prediction mode of the current block and an initial motion vector according to the inter-prediction mode. The method also includes calculating a template matching cost by applying a template matching method to the current block and a corresponding reference block that is a reference block present in a search range of a reference picture with the initial motion vector as a reference. The method also includes calculating a discontinuity measure at a boundary of the reference block by applying a method of utilizing spatial correlation. The method also includes calculating a combined cost by a weighted summation with weights on the template matching cost and the discontinuity measure. The method also includes selecting from the search range a reference block having a minimum of the combined cost, and then generating a final motion vector by refining the initial motion vector based on motion information between the reference block having been selected and the current block.

Yet another aspect of the present disclosure provides a computer-readable recording medium storing a bitstream generated by a video encoding method. The video encoding method includes determining an inter-prediction mode of a current block and an initial motion vector according to the inter-prediction mode. The video encoding method also includes calculating a template matching cost by applying a template matching method to the current block and a corresponding reference block that is a reference block present in a search range of a reference picture with the initial motion vector as a reference. The video encoding method also includes calculating a discontinuity measure at a boundary of the reference block by applying a method of utilizing spatial correlation. The video encoding method also includes calculating a combined cost by a weighted summation with weights on the template matching cost and the discontinuity measure. The video encoding method also includes selecting from the search range a reference block having a minimum of the combined cost, and then generating a final motion vector by refining the initial motion vector based on motion information between the reference block having been selected and the current block.

As described above, the present disclosure provides a video coding method and an apparatus that derive, during decoder-side motion vector derivation, motion vectors by taking into account the spatial correlation of the current block with surrounding blocks instead of deriving motion vectors by considering only the cost of current and prediction blocks. Thus, the video coding method and the apparatus minimizing discontinuities at block boundaries, which are disadvantages of motion prediction that performs motion compensation per block basis to improve video quality and increase video coding efficiency.

DETAILED DESCRIPTION

Figure 1:
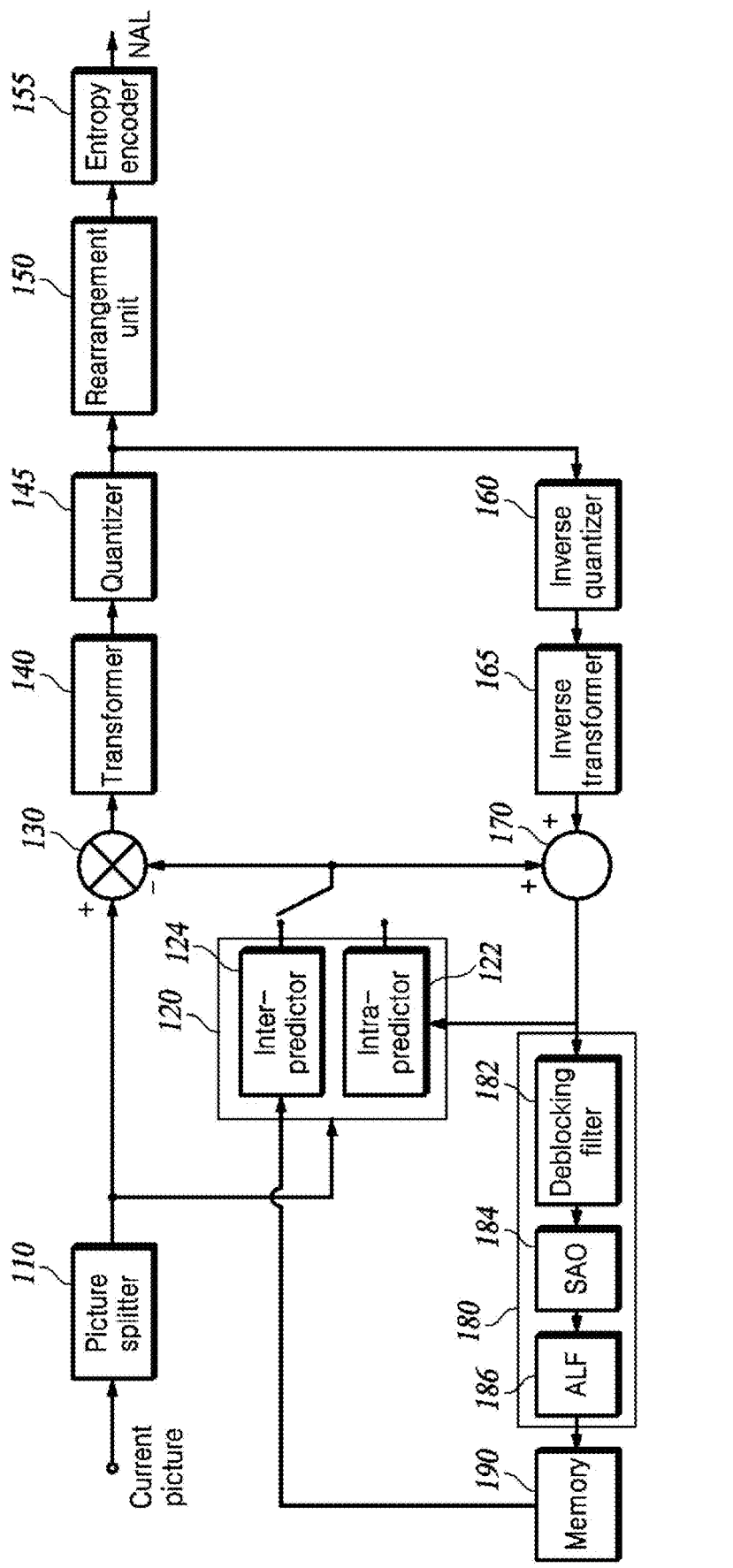
FIG. 1 is a block diagram of a video encoding apparatus that may implement the techniques of the present disclosure.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure.

Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binary tree (BT) in which the higher node is split into two lower nodes. The tree structure may also be a ternary tree (TT) in which the higher node is split into three lower nodes at a ratio of 1:2:1. The tree structure may also be a structure in which two or more structures among the QT structure, the BT structure, and the TT structure are mixed. For example, a quadtree plus binary tree (QTBT) structure may be used or a quadtree plus binary tree ternary tree (QTBTTT) structure may be used. Here, a binary tree ternary tree (BTTT) is added to the tree structures to be referred to as a multiple-type tree (MTT).

Figure 2:
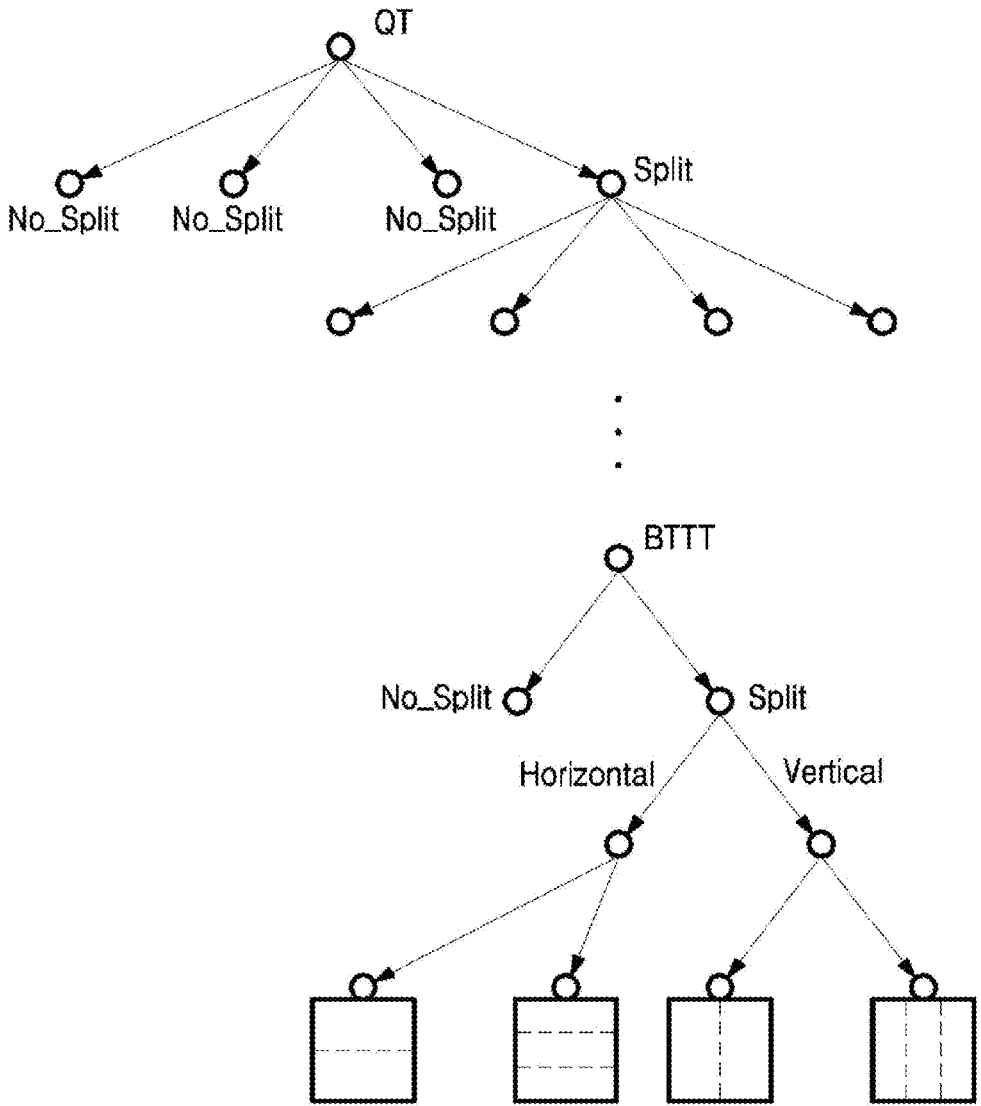
FIG. 2 illustrates a method for partitioning a block using a quadtree plus binary tree ternary tree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
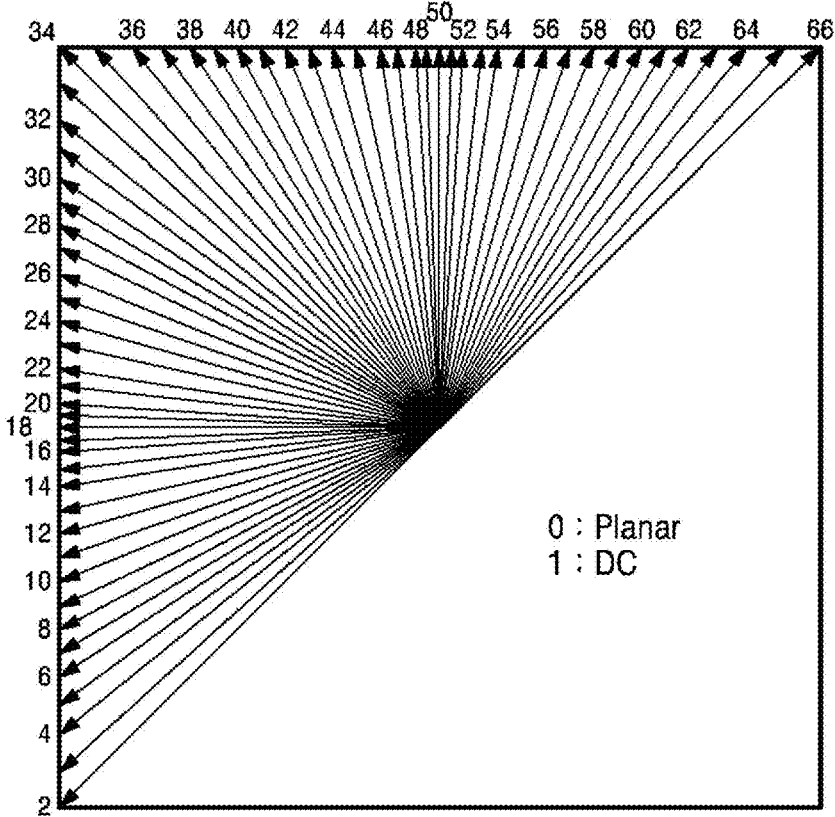
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
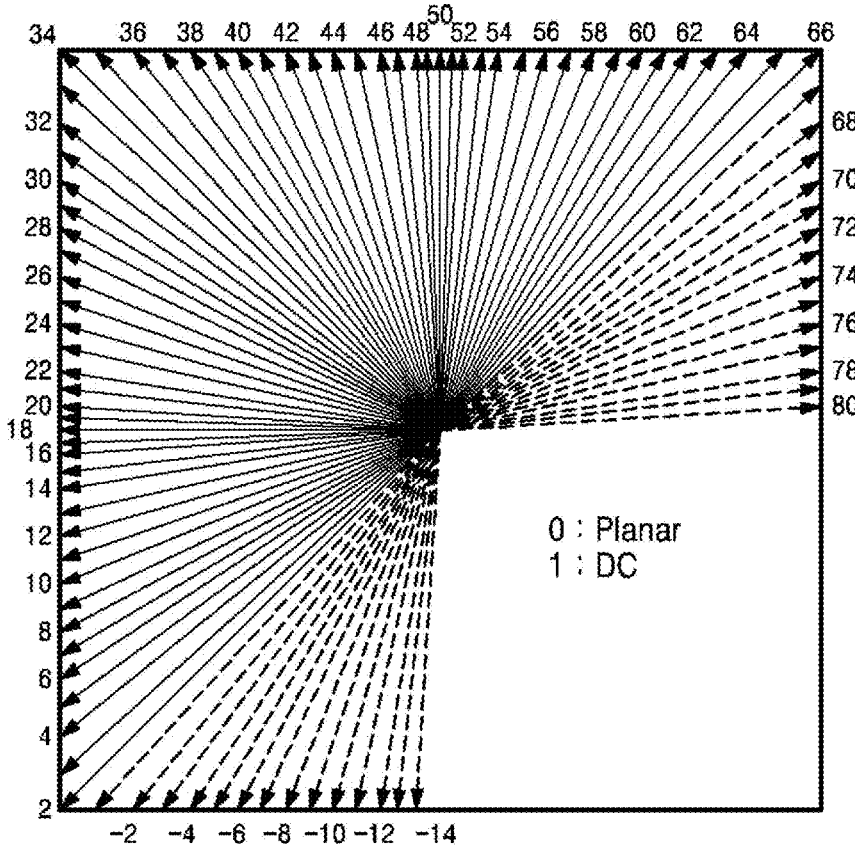

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current block in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
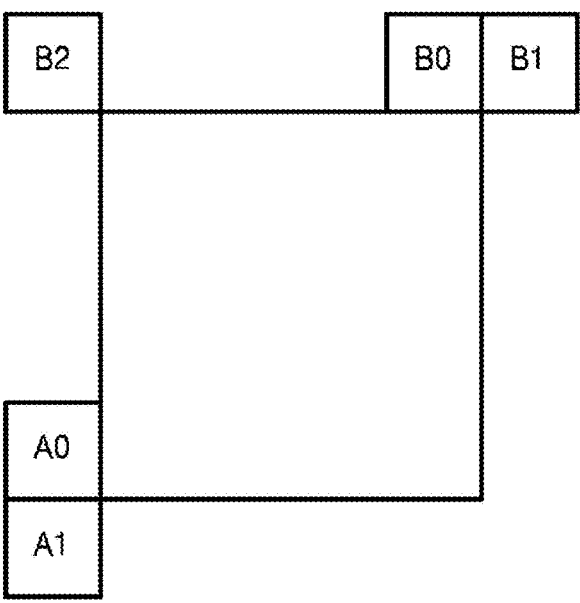
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
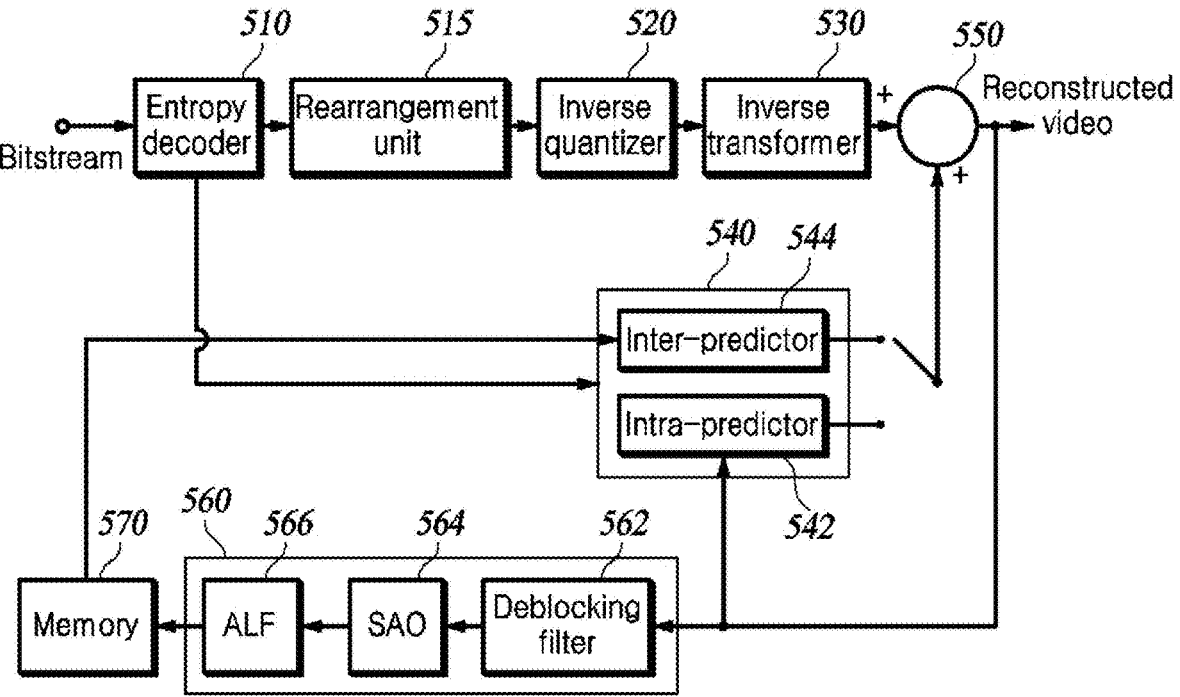
FIG. 5 is a block diagram of a video decoding apparatus that may implement the techniques of the present disclosure.
Figure 6:
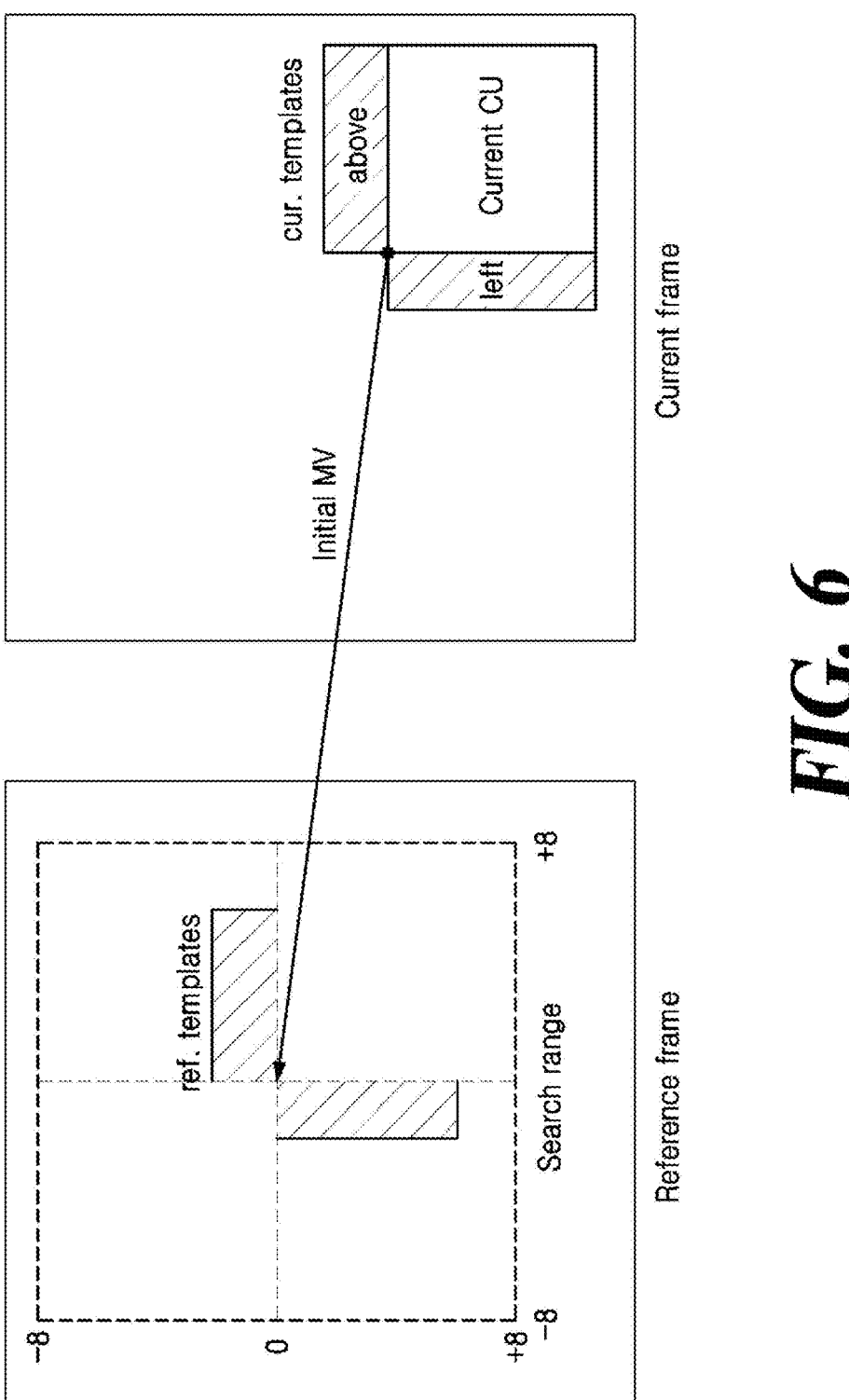
FIG. 6 is a diagram illustrating template matching.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus to minimize the discontinuity at the block boundary, which is a drawback of motion prediction that performs motion compensation per block basis. The video coding method and the apparatus derive, during decoder-side motion vector derivation, a motion vector by considering the spatial correlation with neighboring blocks instead of deriving a motion vector by considering only the cost of the current block and the prediction block.

The following embodiments may be performed by the predictor 120 in the video encoding device. The following embodiments may also be performed by predictor 540 in the video decoding device.

The video encoding device when encoding the current block may generate signaling information associated with the present embodiments in terms of optimizing rate distortion. The video encoding device may use the entropy encoder 155 to encode the signaling information and transmit the encoded signaling information to the video decoding device. The video decoding device may use the entropy decoder 510 to decode, from the bitstream, the signaling information associated with decoding the current block.

In the following description, the term "target block" may be used interchangeably with the current block or coding unit (CU). The term "target block" may refer to some region of the coding unit.

Further, the value of one flag being true indicates when the flag is set to 1. Additionally, the value of one flag being false indicates when the flag is set to 0.

I. Combined Intra/Inter Prediction Mode and Geometric Partitioning Mode

As described above, the motion information compensation may be performed by using the better method selected between the method of refining the motion vector based on the template matching cost by the template matching method and the method of refining the motion vector based on the discontinuity measure of the block boundary by the method taking into account spatial correlation. The template matching method calculates the template matching cost between the current block and the reference block by using the similarity between the templates neighboring the current block and the templates neighboring the corresponding reference block. Further, the method taking into account spatial correlation may take a discontinuity measure at a boundary between the samples in the reference block and the reference block's neighboring samples. In this case, the discontinuity measure indicates the degree of spatial correlation between the samples in the block and the block's neighboring samples at the boundary of the block.

Figure 8:
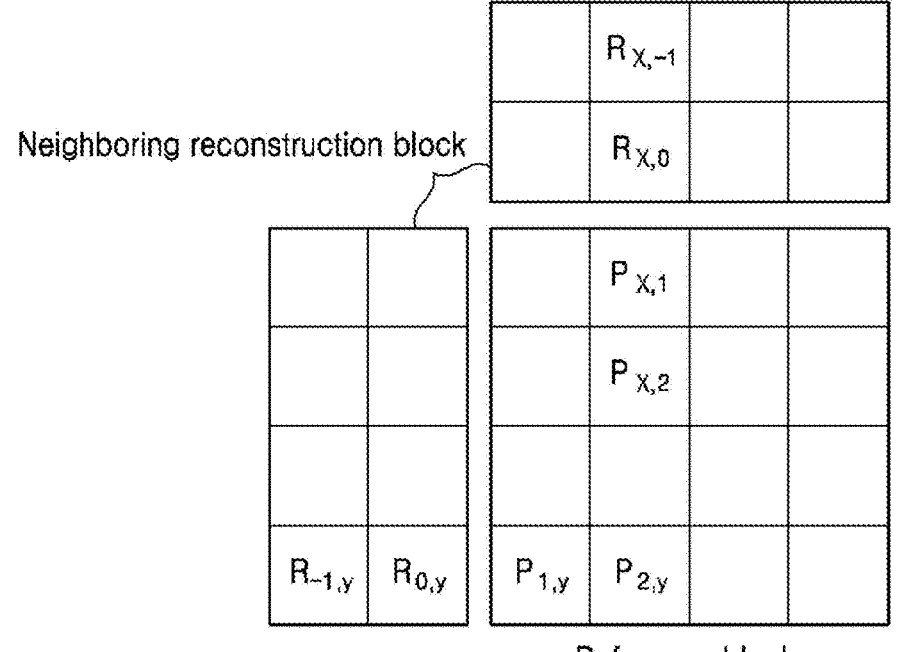
FIG. 8 is a diagram illustrating a measurement of spatial correlation at the boundaries of blocks.

On the other hand, as in the illustration of FIG. 8, to refine the motion vector taking account of the spatial correlation, the video decoding device may take the discontinuity measure at the boundary of the block. Using the samples at the block boundaries, the video decoding device may calculate a cost, which is the discontinuity measure at the block boundaries, as shown in Equation 1. Here, the samples at the block boundaries represent the block's internal samples $(P_{x,1}, P_{x,2}, P_{1,y}, P_{2,y}, \ldots)$ and the block's neighboring samples $(R_{x,-1}, R_{x,0}, R_{-1,y}, R_{0,y}, \ldots)$ in the example of FIG. 8.

$$\text{cost} = \sum_{x=0}^{w-1}(|2P_{x,1} - P_{x,2} - R_{x,0}| + |2R_{x,0} - P_{x,1} - R_{x,-1}|) + \qquad \text{[Equation 1]}$$
$$\sum_{y=0}^{h-1}(|2P_{1,y} - P_{2,y} - R_{0,y}| + |2R_{0,y} - P_{1,y} - R_{-1,y}|)$$

The video decoding device assumes that the block with the smallest cost value within the search range, i.e., the block with the lowest discontinuity measure, is the block with the highest similarity to the current block, and uses the relevant motion information for the motion information compensation.

Figure 7:
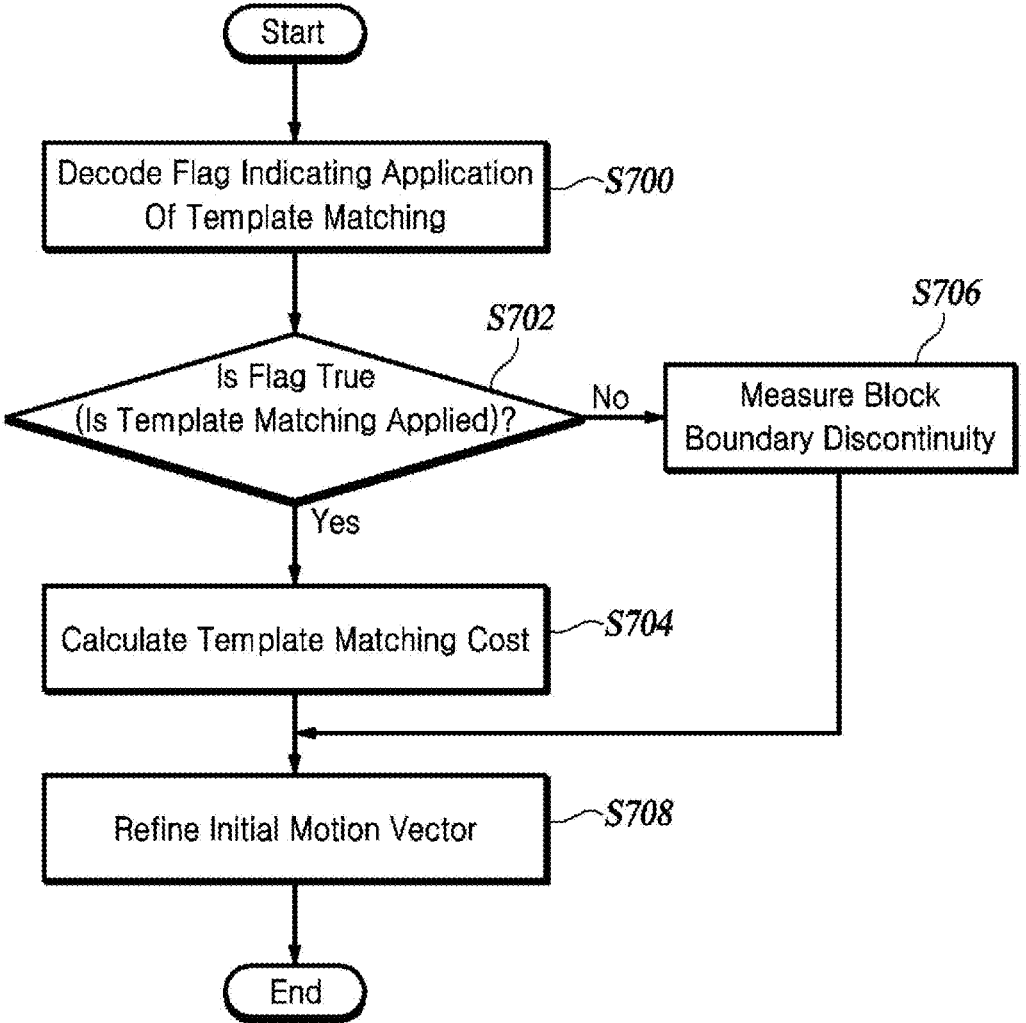
FIG. 7 is a flowchart illustrating motion vector derivation by a video decoding device.

Hereinafter, the motion information derivation method taking into account spatial correlation may be referred to with dual meaning. The motion information derivation method taking into account spatial correlation may indicate a case in a strict sense of using a discontinuity measure according to Equation 1 for the motion information compensation and/or a case in a broad sense of following the steps of FIG. 7 for the motion information compensation.

The motion information derivation method taking into account spatial correlation is limited to AMVP mode and regular merge mode but can be extended and applied to other modes of inter prediction, such as combined intra/inter prediction mode (CIIP) or geometric partitioning mode (GPM).

The combined intra/inter prediction mode generates an intra-inter prediction merging candidate list identical to the regular merging candidate list. The geometric partitioning mode reduces complexity by composing a geometric partitioning merging candidate list containing only unidirectional motion information from the regular merging candidate list. Each inter-prediction mode selects the optimal candidate mode among the candidate modes in the generated candidate list and uses the motion vector of the selected candidate mode as the motion vector of the relevant prediction mode. At this time, various methods may be used to select the optimal candidate mode among the candidate modes in each candidate list. The present disclosure does not consider a method for selecting an optimal candidate mode among the candidate modes in each candidate list.

Hereinafter, the embodiments according to the present disclosure is described with a focus on the video decoding device. However, those embodiments can be applied likewise to the video encoding device.

II. Embodiments According to the Present Disclosure

<Example 1> Extension of Motion Information Derivation Method Taking into Account Spatial Correlation In Example 1, the video decoding device determines, as an initial motion vector, the motion vector of an optimal candidate mode selected from a candidate list of a corresponding prediction mode that is the combined intra/inter prediction mode or geometric partitioning mode. The video decoding device then selects a more efficient method between a method of refining the motion vector based on a template matching cost by the template matching method and a method of refining the motion vector based on a discontinuity measure at the block boundary by the method utilizing spatial correlation. As described above, the video decoding device may parse a flag indicating which of the two methods is selected.

This can be described in other words. According to Example 1, the video decoding device may derive an initial motion vector from a list of candidates for the conventional combined intra/inter prediction mode or geometric partitioning mode, and then use the initial motion vector and search range as bases for refining the motion vector based on template matching and further use the discontinuity at the block boundary using the spatial correlation as a basis for refining the motion vector. Thus, according to Example 1, extension to the combined intra/inter prediction mode or geometric partitioning mode may be made from the motion vector refining method using the template matching cost by the template matching method or from the motion vector refining method using the discontinuity measure at the block boundary by the method using spatial correlation.

The search range may have a sample range of a preset size in the horizontal and vertical directions with the initial motion vector as a reference in the reference picture, as described above.

<Example 2> Combining Motion Compensation Method Based on Template Matching Cost and Motion Compensation Method Based on Discontinuity Measure at Block Boundary In Example 2, the video decoding device may refine the motion vector by combining the motion compensation method based on the template matching cost with the motion compensation method based on the discontinuity measure at the block boundary.

Figure 9:
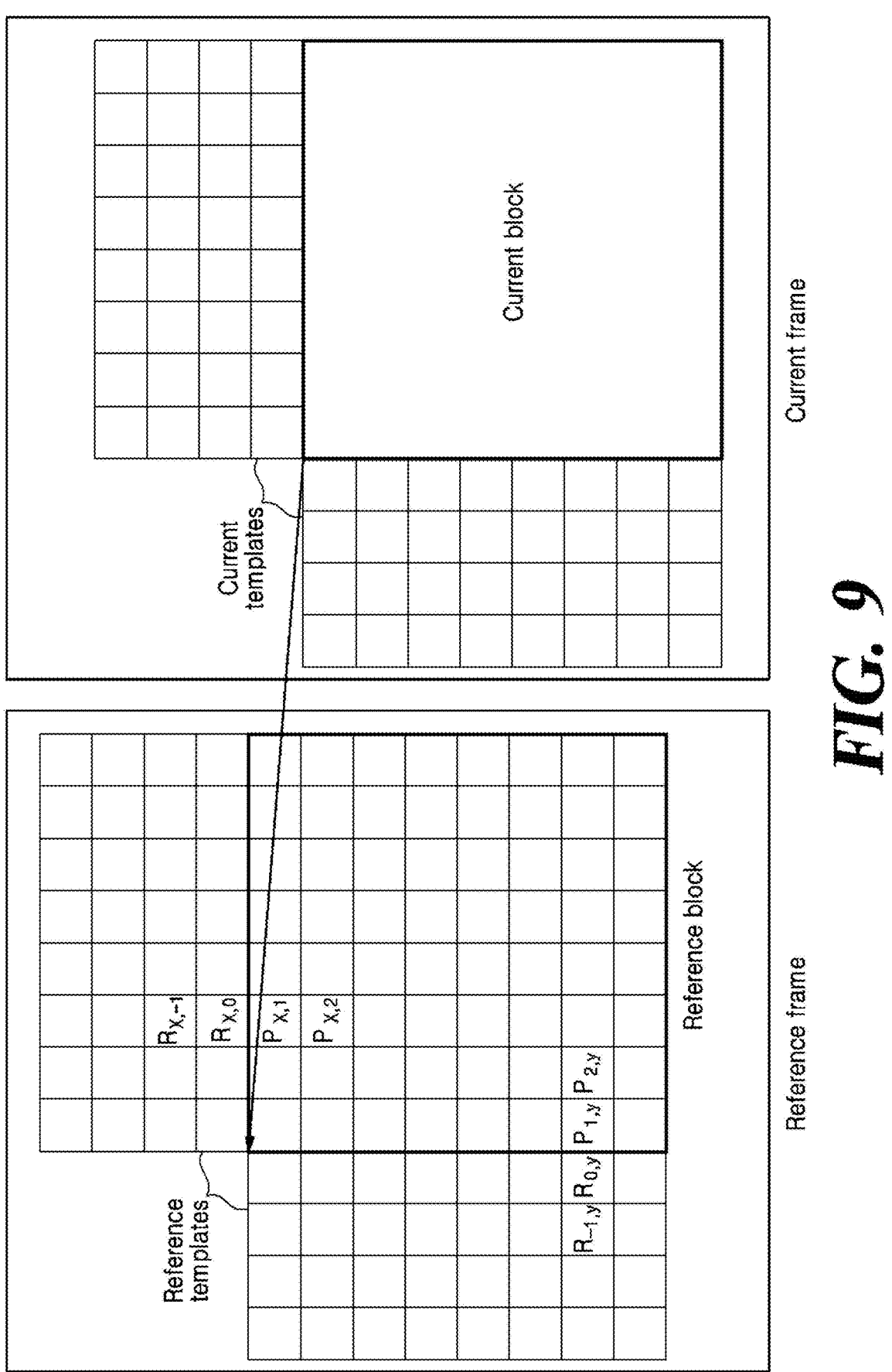
FIG. 9 is a diagram illustrating a motion vector refinement according to at least one embodiment of the present disclosure.

FIG. 9 is a diagram illustrating a motion vector refinement according to at least one embodiment of the present disclosure.

When using the template matching method, the video decoding device determines an optimal matching block within the search range based on a cost value between the templates. Here, the templates represent the current block's neighboring templates hereinafter referred to as current templates illustrated in FIG. 9, and neighboring templates that are in the reference picture and adjacent to the corresponding block (hereafter, a reference block) to the current block, and are hereinafter referred to as reference templates illustrated in FIG. 9. The video decoding device refines the initial motion vector by using the motion information between the templates of the current block and the selected templates within the search range. For example, the video decoding device may refine the initial motion vector by using the motion information between the current block and the selected blocks within the search range.

When the method using spatial correlation is used, the video decoding device identifies a boundary between the reference block's internal samples that are $P_{x,1}$, $P_{x,2}$, $P_{1,y}$, $P_{2,y}$, ... illustrated in FIG. 9 and its neighboring samples that are $R_{x,-1}$, $R_{x,0}$, $R_{-1,y}$, $R_{0,y}$, ... illustrated in FIG. 9, and at the boundary, the video decoding device uses a discontinuity value calculated according to Equation 1 as a basis for determining an optimal matching block within the search range. The video decoding device refines the initial motion vector by using the motion information between the selected block and the current block within the search range.

In Example 2, the video decoding device combines the aforementioned template matching method with the method using spatial correlation. As illustrated in FIG. 9, the video decoding device first calculates a matching cost between the current templates that are the neighboring blocks of the current block and the reference templates that are the neighboring blocks of the reference block corresponding to the current block. Then, the video decoding device calculates a discontinuity measure at the boundary of the reference block according to Equation 1. Here, the reference block is an arbitrary block that is present in the search range with the initial motion vector as a reference.

The video decoding device may determine a combined cost ($cost_{comb}$) by weighted summing the template matching cost and the discontinuity measure at the boundary, as shown in Equation 2.

$$cost_{comb} = W_{template} \times cost_{template} + W_{disconti} \times cost_{disconti} \quad \text{[Equation 2]}$$

Here, $W_{template}$ and $W_{disconti}$ denote the weight of the template matching method and the weight of the method using spatial correlation, respectively. The relationship between the two weights is that $W_{template} + W_{disconti} = 1$. The range of the two weights is $0 \leq W_{template} \leq 1$, and $0 \leq W_{disconti} \leq 1$. Additionally, $cost_{template}$ and $cost_{disconti}$ denote the template matching cost and the discontinuity measure at the discontinuity boundary, respectively.

The video decoding device may generate the final motion vector by refining the initial motion vector by using the motion information between the current block and the block with the lowest combined cost within the search range. The video decoding device may then use the block indicated by the final refined motion vector as a prediction block of the current block.

By Example 2, the video decoding device may use template matching to calculate the costs of the current block and the corresponding reference block and use the calculated costs to indirectly compare the prediction accuracy of the blocks. Further, the video decoding device can compare the spatial correlation by calculating a cost representing a discontinuity measure at the boundary of the reference block between samples within the block and neighboring samples of the block. Thus, the method of Example 2 can solve the problems of conventional template matching and the problems of methods using spatial correlation and can perform more accurate motion compensation.

<Example 3> Combining Example 1 and Example 2

In Example 3, the video decoding device merges the method according to Example 1 and the method according to Example 2 and uses Example 1 and Example 2 together. In Example 1, the video decoding device uses the existing motion information derivation method considering spatial correlation by extending it to a combined intra/inter prediction mode of inter prediction and a geometric partitioning mode. In Example 2, the video decoding device performs the motion information compensation by combining a motion compensation method based on template matching and a motion compensation method based on discontinuity measure at the block boundary.

In Example 3, the video decoding device uses the motion compensation method according to Example 2 in an intra-inter mode or geometric partitioning mode of inter prediction according to Example 1. The video decoding device uses the motion compensation method according to Example 2 in the template matching mode or the regular merge mode of the inter prediction. Further, for the various inter-prediction modes used by inter prediction, the video decoding device may perform motion compensation by using any of the following methods including a motion compensation method based on template matching, a motion compensation method based on a spatial correlation measure, or a motion compensation method incorporates both the template matching and the spatial correlation according to Example 2.

Figure 10:
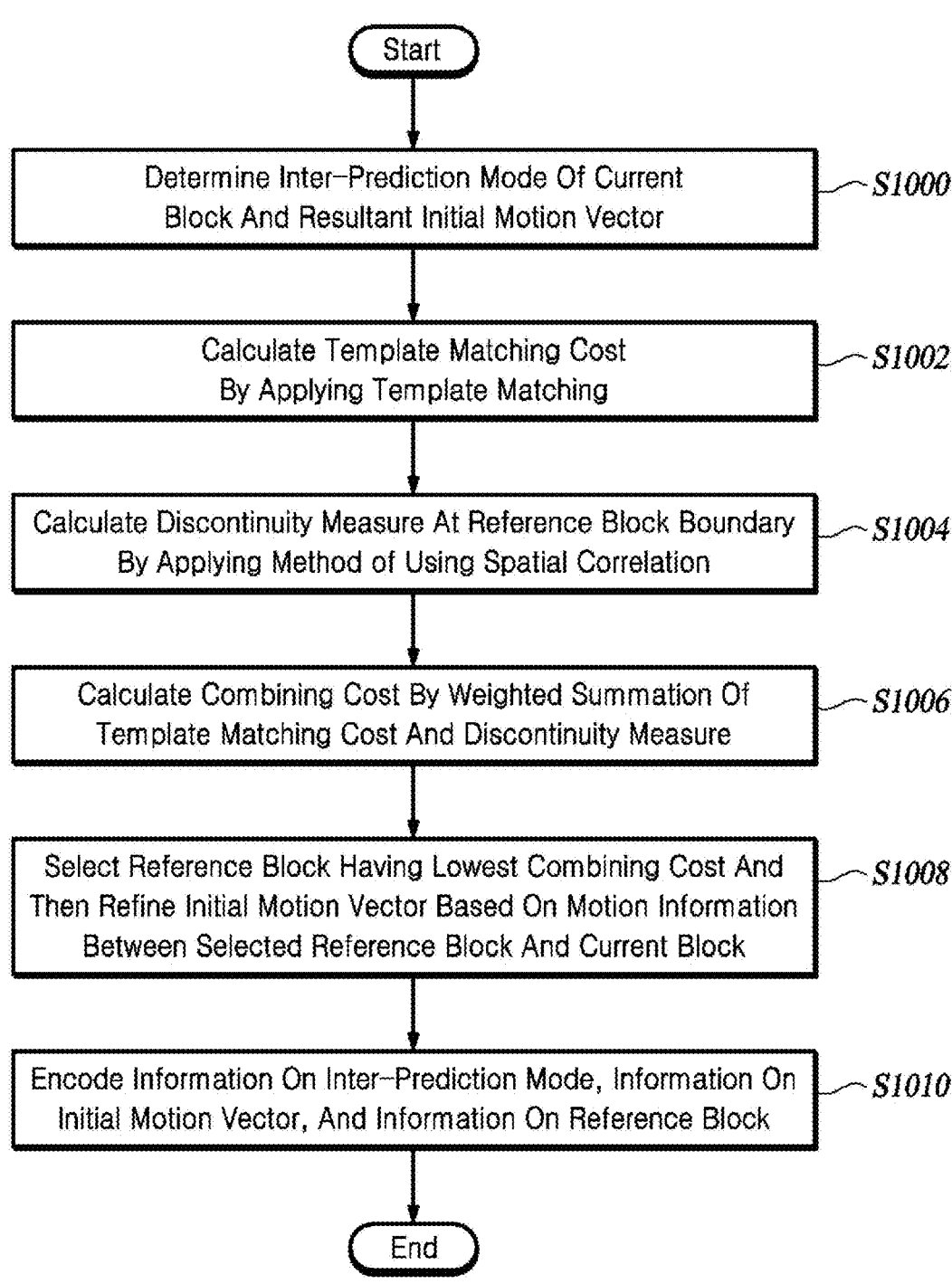
FIG. 10 is a flowchart of a method performed by a video encoding device for refining a motion vector, according to at least one embodiment of the present disclosure.
Figure 11:
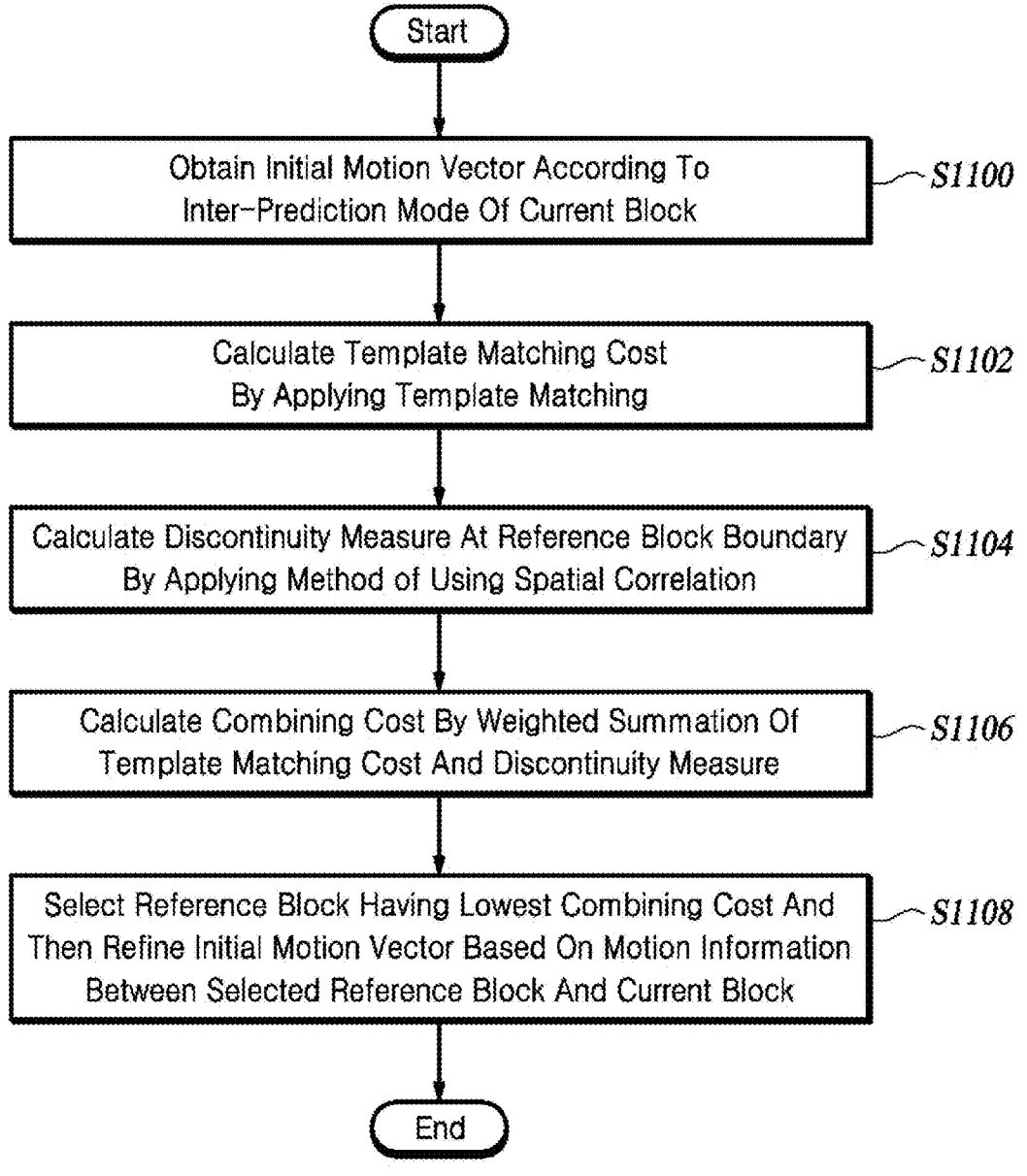
FIG. 11 is a flowchart of a method performed by a video decoding device for refining a motion vector, according to at least one embodiment of the present disclosure.

Referring now to FIGS. 10 and 11, a method of refining a motion vector of a current block according to Example 3 is described.

FIG. 10 is a flowchart of a method performed by the video encoding device for refining a motion vector, according to at least one embodiment of the present disclosure.

The video encoding device determines an inter-prediction mode of the current block and the corresponding initial motion vector (S1000).

The video encoding device may determine the inter-prediction mode of the current block and the corresponding initial motion vector in terms of optimizing rate distortion. Here, the intra-prediction mode may be an AMVP mode, a merge mode, a combined intra/inter prediction mode, or a geometric partitioning mode. The video encoding device may determine the inter-prediction mode and the corresponding initial motion vector in terms of optimizing rate distortion. For example, the video encoding device may determine, as the initial motion vector, a motion vector of an optimal candidate mode selected from a candidate list of determined inter-prediction modes.

The video encoding device calculates a template matching cost by applying a template matching method to the current block and the corresponding reference block (S1002). Here, the reference block is an arbitrary block that is present in a search range of the reference picture with the initial motion vector as a reference. Further, the search range may have a sample range of a preset size in the horizontal and vertical directions with the initial motion vector as a reference in the reference picture, as described above.

The template matching method may calculate a template matching cost between the current block and the reference block by using a similarity between a neighboring template of the current block and a neighboring template of the corresponding reference block.

The video encoding device calculates a discontinuity measure at the boundary of the reference block by applying a method using spatial correlation (S1004). This method considering spatial correlation takes the discontinuity measure according to Equation 1 at the boundary between samples in the reference block and its neighboring samples.

The video encoding device calculates a combined cost by a weighted summation with weights on the template matching cost and the discontinuity measure (S1006).

The video encoding device selects a reference block having a minimum combined cost within the search range and then generates a final motion vector by refining the initial motion vector based on the motion information between the selected reference block and the current block (S1008).

The video encoding device may then use the block indicated by the final refined motion vector as a prediction block of the current block.

The video encoding device encodes information on the inter-prediction mode, information on the initial motion vector, and information on the reference picture (S1010).

FIG. 11 is a flowchart of a method performed by the video decoding device for refining a motion vector, according to at least one embodiment of the present disclosure.

The video decoding device obtains an initial motion vector according to the inter-prediction mode of the current block (S1100).

Here, the inter-prediction mode may be an AMVP mode, a merge mode, a combined intra/inter prediction mode, or a geometric partitioning mode. The video decoding device decodes information on the inter-prediction mode from the bitstream and uses the information to generate an initial motion vector. For example, the video decoding device may determine the initial motion vector with a motion vector of an optimal candidate mode selected from a candidate list of inter-prediction modes.

The video decoding device calculates a template matching cost by applying a template matching method to the current block and the corresponding reference block (S1102). Here, the reference block is an arbitrary block that is present in the search range of the reference picture with the initial motion vector as a reference.

The video decoding device applies the method using spatial correlation to calculate a discontinuity measure at the boundary of the reference block (S1104).

The video decoding device calculates a combined cost by a weighted summation with weights on the template matching cost and the discontinuity measure (S1106).

The video decoding device selects a reference block having a minimum combined cost within the search range and then generates a final motion vector by refining the initial motion vector based on motion information between the selected reference block and the current block (S1108).

Thereafter, the video decoding device may use the block indicated by the final refined motion vector as a prediction block for the current block.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

What is claimed is:

1. A method performed by a video decoding device for refining a motion vector of a current block, the method comprising:

obtaining an initial motion vector according to an inter-prediction mode of the current block;

calculating a template matching cost by applying a template matching method to the current block and a plurality of reference blocks present in a search range of a reference picture with the initial motion vector as a reference;

calculating a discontinuity measure at a boundary of each of the reference blocks;

calculating a combined cost by a weighted summation with weights on the template matching cost and the discontinuity measure;

selecting from the search range a reference block having a minimum of the combined cost; and generating a final motion vector by refining the initial motion vector based on motion information between the selected reference block and the current block, wherein a sum of the weights is equal to 1, and the weights each have a value in a range from 0 to 1.

2. The method of claim 1, wherein the inter-prediction mode includes:

an advanced motion vector prediction (AMVP) mode, a merge mode, a combined intra/inter prediction mode, or a geometric partitioning mode.

3. The method of claim 1, wherein obtaining the initial motion vector includes:

decoding information on the inter-prediction mode from a bitstream, and then using the information to generate the initial motion vector.

4. The method of claim 1, wherein the template matching method includes:

calculating the template matching cost between the current block and each of the reference blocks by using a similarity between a neighboring template of the current block and a neighboring template of each of the reference blocks.

5. The method of claim 1, wherein the discontinuity measure is calculated by applying a method of utilizing spatial correlation.

6. The method of claim 5, wherein the method of utilizing spatial correlation includes:

calculating the discontinuity measure at the boundary within the reference block between samples and neighboring samples.

7. The method of claim 1, wherein the search range has a sample range of a predetermined size in horizontal and vertical directions with the initial motion vector as a reference.

8. A method performed by a video encoding device for refining a motion vector of a current block, the method comprising:

determining an inter-prediction mode of the current block and an initial motion vector according to the inter-prediction mode;

calculating a template matching cost by applying a template matching method to the current block and a plurality of reference blocks present in a search range of a reference picture with the initial motion vector as a reference;

calculating a discontinuity measure at a boundary of each of the reference blocks;

calculating a combined cost by a weighted summation with weights on the template matching cost and the discontinuity measure; and selecting from the search range a reference block having a minimum of the combined cost; and generating a final motion vector by refining the initial motion vector based on motion information between the selected reference block and the current block, wherein a sum of the weights is equal to 1, and the weights each have a value in a range from 0 to 1.

9. The method of claim 8, further comprising:

encoding information on the inter-prediction mode, information on the initial motion vector, and information on the reference picture.

10. The method of claim 8, wherein the inter-prediction mode includes:

an advanced motion vector prediction (AMVP) mode, a merge mode, a combined intra/inter prediction mode, or a geometric partitioning mode.

11. The method of claim 8, wherein the template matching method includes:

calculating the template matching cost between the current block and each of the reference blocks by using a similarity between a neighboring template of the current block and a neighboring template of each of the reference blocks.

12. The method of claim 8, wherein the discontinuity measure is calculated by applying a method of utilizing spatial correlation.

13. The method of claim 12, wherein the method of utilizing spatial correlation includes:

calculating the discontinuity measure at the boundary within the reference block between samples and neighboring samples.

14. A non-transitory computer-recording medium storing instructions, when executed by a processor, to perform an encoding method for generating a bitstream comprising:

determining an inter-prediction mode of a current block and an initial motion vector according to the inter-prediction mode;

calculating a template matching cost by applying a template matching method to the current block and a plurality of reference blocks present in a search range of a reference picture with the initial motion vector as a reference;

calculating a discontinuity measure at a boundary of each of the reference blocks;

calculating a combined cost by a weighted summation with weights on the template matching cost and the discontinuity measure;

selecting from the search range a reference block having a minimum of the combined cost;

and generating a final motion vector by refining the initial motion vector based on motion information between the selected reference block and the current block, wherein a sum of the weights is equal to 1, and the weights each have a value in a range from 0 to 1.

15. The non-transitory computer-readable recording medium of claim 14, wherein the inter-prediction mode includes:

an advanced motion vector prediction (AMVP) mode, a merge mode, a combined intra/inter prediction mode, or a geometric partitioning mode.

16. The non-transitory computer-readable recording medium of claim 14, wherein obtaining the initial motion vector includes:

decoding information on the inter-prediction mode from a bitstream, and then using the information to generate the initial motion vector.

17. The non-transitory computer-readable recording medium of claim 14, wherein the template matching method includes:

calculating the template matching cost between the current block and each of the reference blocks by using a similarity between a neighboring template of the current block and a neighboring template of each of the reference blocks.

18. The non-transitory computer-readable recording medium of claim 14, wherein the discontinuity measure is calculated by applying a method of utilizing spatial correlation.

19. The non-transitory computer-readable recording medium of claim 18, wherein the method of utilizing spatial correlation includes:

calculating the discontinuity measure at the boundary within the reference block between samples and neighboring samples.

* * * * *